Figure 1:
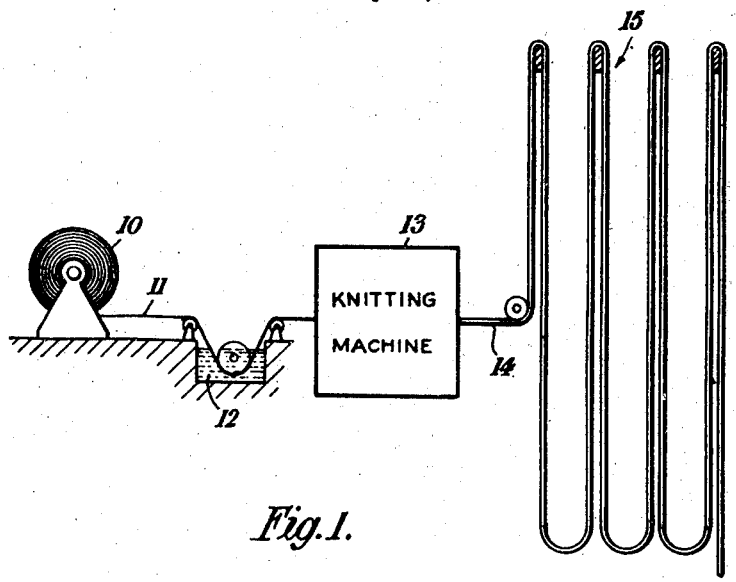

April 13, 1948.  G. A. SOWERBY ET AL  2,439,586
BELTING
Filed July 25, 1945

INVENTORS
G. A. Sowerby &
W. S. Short
By Watson, Cole, Grindle &
Watson

Patented Apr. 13, 1948

2,439,586

UNITED STATES PATENT OFFICE 2,439,586

BELTING

George Angus Sowerby, Newcastle-on-Tyne, and William Stanley Short, Seaton Burn, Newcastle-on-Tyne, England, assignors to George Angus & Company Limited, Newcastle-on-Tyne, England Application July 25, 1945, Serial No. 607,026
In Great Britain August 16, 1944

3 Claims. (Cl. 28—74)

Belting is frequently manufactured from woven cloth and often has a coating of rubber calendered on to the driving face for the purpose of increasing the coefficient of friction. Multi-ply belting is commonly built up of superposed plies of woven fabric on to which rubber has been calendered, the rubber serving to effect adhesion between the several plies. It is known to stretch such multi-ply belting after the plies have been stuck together and to vulcanize the rubber under heat while the belting is so stretched, the rubber then serving the further purpose of preventing subsequent contraction of the belting.

The object of this invention is to enable belting to be manufactured from knitted textile fabric. The use of knitted fabric for this purpose is desirable not only because knitting constitutes one of the cheapest methods of converting yarn into a fabric, but also because, as hereinafter more fully explained, the ends of a strip of knitted fabric unlike those of a strip of woven or braided fabric can be joined to form a joint which is truly homogeneous with the remainder of the strip, which renders the use of knitted fabric of especial advantage for the manufacture of endless belting. Woven belting can, it is true, be made truly endless by a complicated process of weaving, using a warp constituted by a single continuous yarn. This procedure however is relatively inconvenient and moreover suffers from the disadvantage that the belt can only be woven to a definite desired length. Knitted belting can however be knitted in a continuous length and cut and joined to make a homogeneous belt of any desired length.

Knitted fabric, as such, however would be of little use for the manufacture of machine belting or even of conveyor belting, owing to its high degree of stretch. Thus knitted cotton fabric has an extension of the order of 50–150% at break, whereas the extension at break of normal belting is of the order of 15%.

The invention provides a method for the manufacture of belting, which consists in applying a lubricant to rubberised yarn, knitting a strip of fabric from the lubricated yarn on a knitting machine, stretching the knitted fabric to a sufficient extent, and curing the rubber, under heat and pressure while the fabric is maintained so stretched.

By the expression "sufficient extent" we mean that the stretching will be sufficient to prevent any substantial further extension of the belting in service, whether for transmission or conveyor purposes. This result will be achieved when the finished product has an extension at break of about 3–17%, as compared with the above-quoted figure for normal knitted fabric of 50–150%. It is necessary for the belting to have a small amount of extensibility to enable it to operate at a belt, and to ensure that the spacing of the pulleys on which it is to operate is not too critical, and the figure of 15% extension at break is that laid down in the British Standard specification for rubberised canvas belting as the maximum permitted extension. For some purposes, however, a somewhat larger extension can be tolerated.

Owing to the high coefficient of friction of rubberised yarn, we find that it is necessary to apply a lubricant to the yarn before knitting and to knit the yarn in the lubricated condition.

We may employ as the lubricant any material which will sufficiently reduce its coefficient of friction to enable the machine to pull the loops satisfactorily through one another during fabrication of the fabric, and which can be removed from the fabric by washing, should it exercise a deleterious effect on the finished belting if left on the fabric.

Thus we may wet the yarn with water or soap solution, immediately prior to knitting, either by dipping the bobbin in a liquid bath or by wetting the yarn on its way from the bobbin to the machine.

As an alternative, however, we may apply to the yarn a greasy material, such for example as graphite, prior to the knitting operation.

By the expression "rubberised yarn" we mean a yarn which has been rubberised by application of rubber, either natural or synthetic, to the constituent fibres during or after spinning. Thus we may use the composite textile and rubber yarn sold under the registered trade-mark "Filastic" and described in British Patents Nos. 338,381 and 344,414.

As an alternative, however, to knitting the fabric from rubberised yarn, we may impregnate a strip of fabric knitted from unrubberised yarn with rubber, by application thereto of rubber latex or rubber solution, dry the fabric, warm it sufficiently to plasticise the rubber, then stretch it and apply heat and pressure to cure the rubber while the fabric is stretched. The preliminary warming to render the rubber plastic is necessary, as otherwise the dry rubber would lock the yarns together and render it impossible to stretch the fabric to the required extent.

We find that, when the rubber is cured under heat and pressure while the fabric is stretched, the vulcanized rubber is effective to prevent subsequent contraction of the fabric to any substantial extent. It will be understood that this procedure differs from the above-described known practice in the manufacture of multi-ply belting from plies of woven cloth, in that the yarn of which the knitted fabric is composed is rubberised—or at least the fabric is impregnated with rubber—an effect not obtained by calendering rubber on to the surface of a piece of cloth.

Moreover while it was known that in the case of the multi-ply belting the rubber, when vulcanised, is effective to prevent the relatively small amount of subsequent contraction which might be expected in the case of a stretched woven fabric, it has not hitherto been appreciated that if fabric knitted from rubberised yarn, or knitted fabric subsequently impregnated with rubber, is sufficiently stretched and vulcanised while stretched, the rubber will prevent the very much larger degree of subsequent contraction to be expected in this case. Curing under heat and pressure no doubt effects sufficient bonding between the particles of rubber on contiguous yarns of the fabric to enable the cured rubber to resist subsequent contraction of the fabric.

Belting according to the invention may be manufactured in single ply or in multi-ply form, being constituted in the latter case by superposed plies of fabric knitted from rubberised yarn, the plies being united during the curing treatment, with or without the interposition of adhesive.

The belting may be made endless by joining the ends of the strip prior to the curing treatment. This may be done by hand knitting, as described in U. S. Patent No. 2,106,119, so as to obtain a joint which is homogeneous with the rest of the belt. Alternatively the join may be made by chamfering the ends of the belt to a wedge form and lapping the two wedges under heat and pressure. This method is mainly suitable in the case of multi-ply belting, as the constituent plies can be cut in stepped formation at each end of the strip. Where desired, however, the ends of the belt can be joined with standard fasteners.

The following are detailed examples of the manufacture of belting in accordance with the invention:

(1) From yarn rubberised during spinning. Standard "Filastic" yarn, after lubrication with soap solution, is knitted on a knitting machine, on which there are two banks of needles opposed to each other. The knit is from alternate needles of one bank to the intermediate alternate needles of the opposing bank. A strip of "Filastic" knitted material is thus produced which is considerably wider and thicker than the final belt required. The width may be some 1½ times the final width and the thickness may be double. This strip may have a stretch of the order of 100%. The strip, after drying either in the air at room temperature or in an oven at low temperatures, e. g., 50° C., is taken to a heated press in which there is a die which, when closed, has the section of the finished belt required. The length of the die is immaterial as the belting may be vulcanised bit by bit. The strip is stretched in the press by moving apart by hydraulic pressure a pair of clamping presses located one on each side of a central vulcanising press, until its section is reduced sufficiently to enter the die of the vulcanising press. It is then placed in the die and the press is closed and allowed to remain closed for approximately the vulcanising period, which may, for example, be from 5 to 20 minutes according to the temperature and rubber composition which have been selected. The press is then opened and the adjacent section of unpressed material is treated in the same way.

Figure 2:
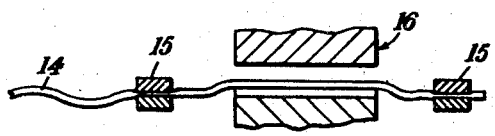
Figure 3:
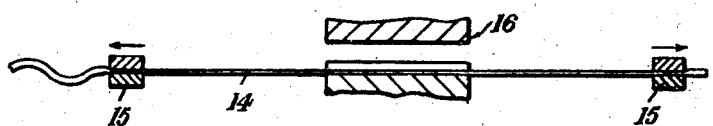
Figure 4:
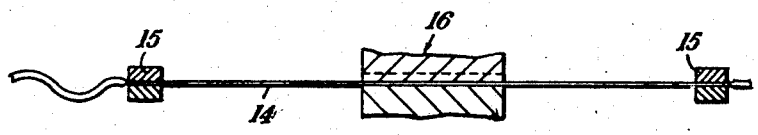

This method is illustrated diagrammatically in the accompanying drawing, in which Fig. 1 shows diagrammatically the knitting operation, and Figs. 2–4 are diagrammatic sectional views showing successive stages in the operation of stretching and curing the belt on the press.

Referring to Fig. 1, rubberised yarn 11 is taken from a bobbin 10 and passed through a lubricating bath 12 of soap solution. The wet yarn is knitted on a knitting machine 13 to form a strip 14 of knitted fabric which is then hung up to allow the soap solution to dry as indicated at 15.

A length of the fabric strip 14 is then gripped (see Fig. 2) by a pair of clamping presses 15 located one on each side of a vulcanising press 16. The clamping presses 15 are then moved apart by hydraulic means (not shown) to stretch the intervening strip to the required extent, as shown in Fig. 3, thus reducing its width and thickness to the amount required for the finished belt. The vulcanising press is then closed (see Fig. 4) to vulcanise a portion of the stretched length of the fabric, this process being repeated to vulcanise the stretched belt bit by bit.

(2) From cotton or other textile yarn impregnated with rubber after spinning, and prior to knitting. Suitable yarn is taken from a cheese and allowed to pass through a bath of latex. It is then dried, powdered and re-wound. The process is carried on from this point in exactly the same way as in Example 1 except that this yarn is substituted for the "Filastic" yarn.

(3) From fabric impregnated with rubber after knitting. A strip of fabric knitted from cotton, flax or other suitable unrubberised textile yarn is immersed in a bath of rubber latex and dried. It is then taken to the press, subjected to a preliminary warming sufficient to plasticise the rubber, stretched while warm and thereafter vulcanised as in Example 1.

What we claim as our invention and desire to secure by Letters Patent is:

1. A method for the manufacture of belting which comprises stretching a strip of fabric knitted from rubberised yarn and curing the rubber under heat and pressure while the fabric is maintained stretched, the extent of stretching being such that the extension at break of the cured fabric is from 3 to 17%

2. A method for the manufacture of belting which comprises stretching a strip of fabric knitted from rubberised yarn, said fabric having an extension at break of 50–150%, and curing the rubber under heat and pressure while the fabric is maintained stretched, the extent of stretching being such that the extension at break of the cured fabric is from 3 to 17%.

3. A method for the manufacture of belting which comprises stretching a strip of fabric knitted from yarn rubberised during spinning and curing the rubber under heat and pressure while the fabric is maintained stretched, the extent of stretching being such that the extension at break of the cured fabric is from 3 to 17%.

GEORGE ANGUS SOWERBY.
WILLIAM STANLEY SHORT.

REFERENCES CITED

The following references are of record in the file of this patent:

UNITED STATES PATENTS

| Number | Name | Date |
|---|---|---|
| 761,054 | Blodgett | May 24, 1904 |
| 2,106,119 | Krasselt | Jan. 18, 1938 |
| 2,152,415 | Krasselt | Mar. 28, 1939 |
| 2,386,761 | Wetherbee | Oct. 16, 1945 |